A. H. IRVING.
SAW TENSION DEVICE FOR BAND SAW MILLS.
APPLICATION FILED MAR. 6, 1911.

Patented Sept. 10, 1912.

Witnesses.
Harry Opsahl.
E. C. Skinkle.

Inventor.
Adam H. Irving.
By his Attorneys.
Williamson & Merchant

A. H. IRVING.
SAW TENSION DEVICE FOR BAND SAW MILLS.
APPLICATION FILED MAR. 6, 1911.
1,037,916.
Patented Sept. 10, 1912.
4 SHEETS—SHEET 3.
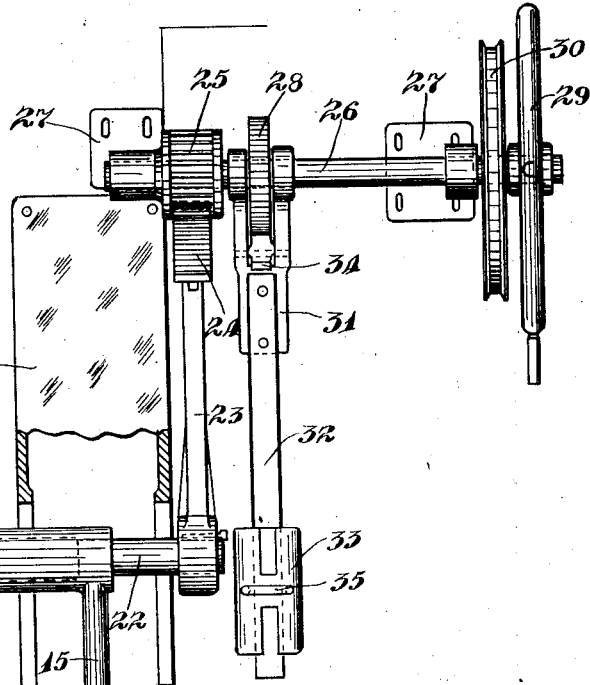
Fig. 3.
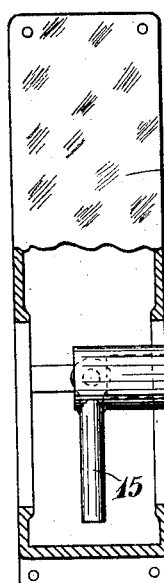
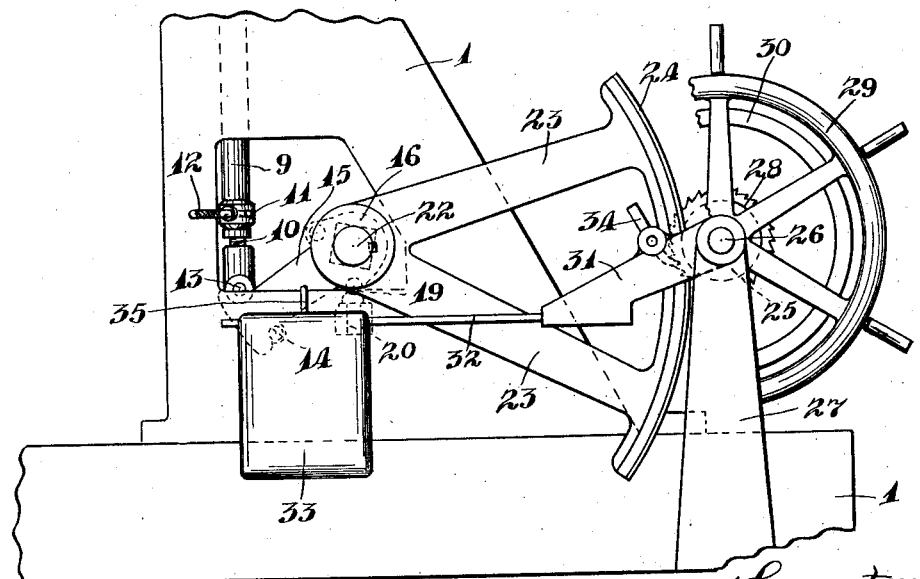
Fig. 4.
Witnesses.
Harry Opsahl.
E. C. Skinkle
Inventor.
Adam H. Irving
By his Attorneys.
Williamson & Merchant A. H. IRVING
SAW TENSION DEVICE FOR LAND SAW MILLS.
APPLICATION FILED MAR. 6, 1911.
1,037,916.
Patented Sept. 10, 1912.
4 SHEETS—SHEET 4.
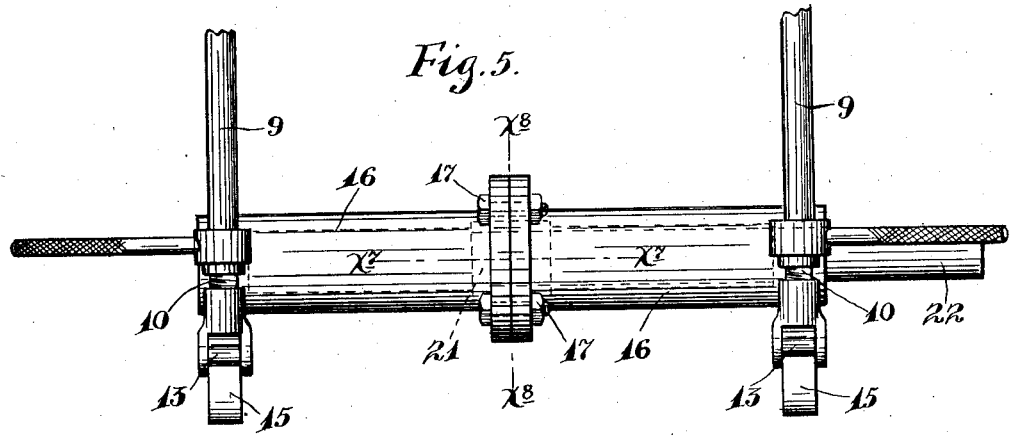
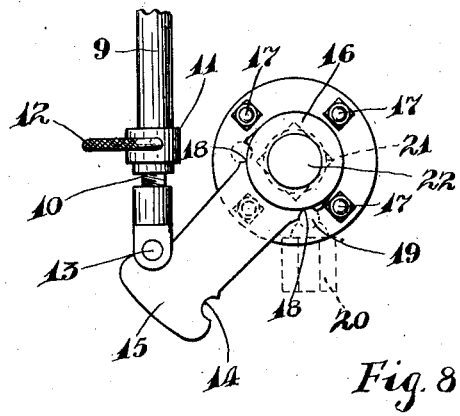
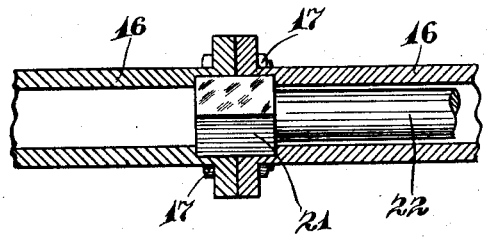
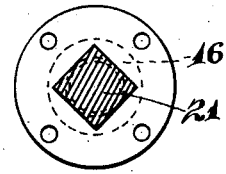
Witnesses.
Harry Opsahl.
E. C. Skinkle
Inventor.
Adam H. Irving.
By his Attorneys.
Williamson Merchant

UNITED STATES PATENT OFFICE.

ADAM HENRY IRVING, OF SPOKANE, WASHINGTON.

SAW-TENSION DEVICE FOR BAND-SAW MILLS.

1,037,916.  Specification of Letters Patent.  Patented Sept. 10, 1912.

Application filed March 6, 1911. Serial No. 612,550.

*To all whom it may concern:*

Be it known that I, ADAM H. IRVING, a citizen of the United States, residing at Spokane, in the county of Spokane and State of Washington, have invented certain new and useful Improvements in Saw-Tension Devices for Band-Saw Mills; and I do hereby declare the following to be a full, clear, and exact description of the invention, such as will enable others skilled in the art to which it appertains to make and use the same.

My invention has for its object to provide an improved saw tension device for band saw mills and, to this end, the invention consists of the novel devices and combinations of devices hereinafter described and defined in the claims.

In the accompanying drawings, which illustrate the invention, like characters indicate like parts throughout the several views.

Figure 1:
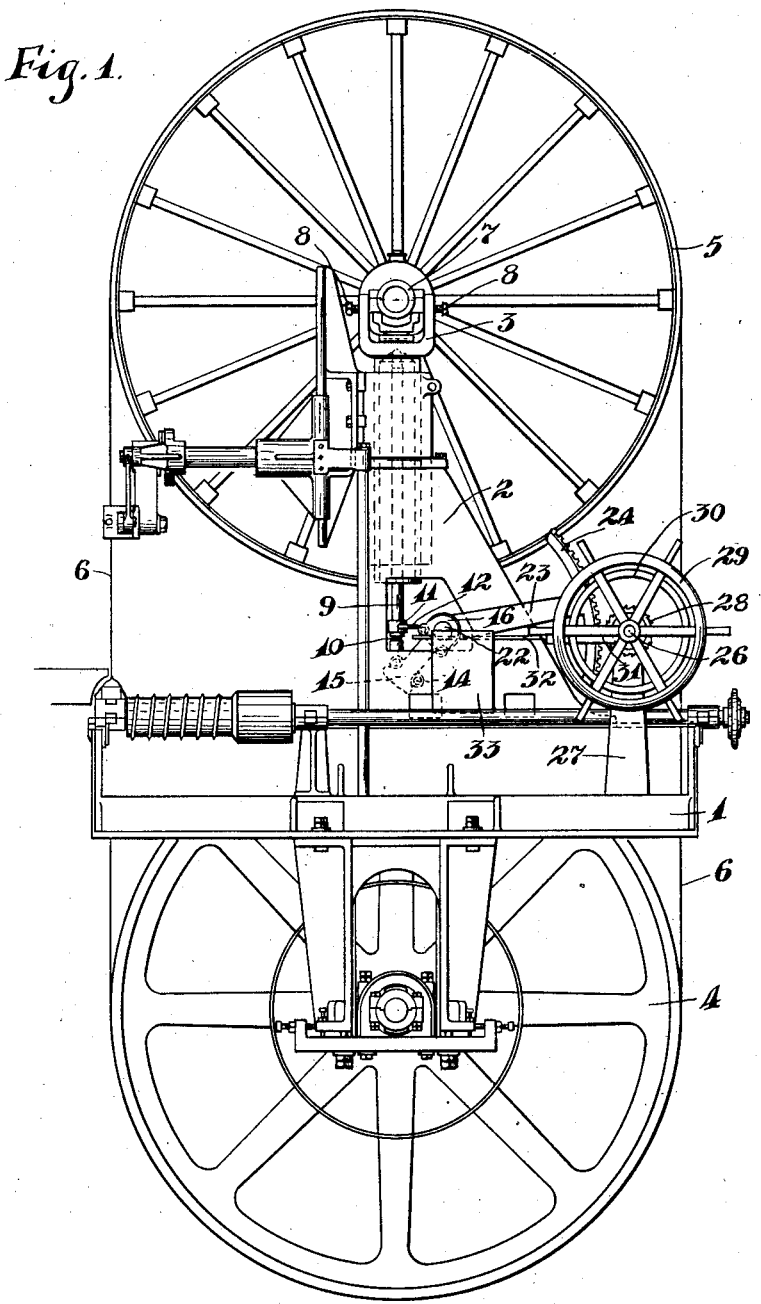
Figure 2:
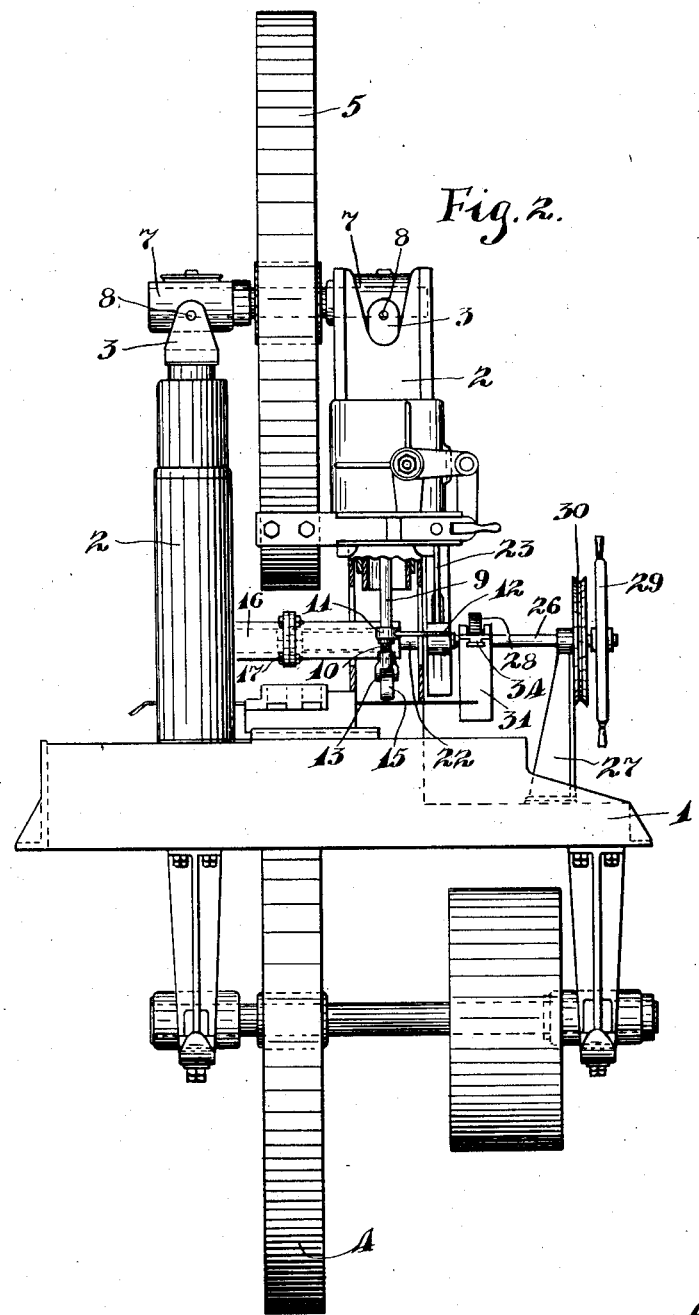

Referring to the drawings, Figure 1 is a view in front elevation, showing a band saw mill having my improved saw tension device applied thereto; Fig. 2 is a side elevation of the parts shown in Fig. 1, some parts being broken away; Fig. 3 is a view chiefly in plan but with some parts sectioned and some parts removed, showing the lower mechanism of the saw tension device; Fig. 4 is a front elevation of the parts shown in Fig. 3; Fig. 5 is a side elevation of certain of the parts shown in Fig. 3, some parts being broken away and some parts being removed; Fig. 6 is a front elevation of the parts shown in Fig. 5; Fig. 7 is a detail chiefly in section on the line $x^7$ $x^7$ of Fig. 5, some parts being shown in full and some parts being broken away; and Fig. 8 is a section taken on the line $x^8$ $x^8$ of Fig. 5.

Of the parts of the band saw mill, the numeral 1 indicates the base frame, the numeral 2 the hollow pedestals, the numeral 3 the upper wheel-supporting columns having hollow stems working telescopically in the pedestals 2, the numeral 4 the lower saw wheel, the numeral 5 the upper saw wheel, and the numeral 6 the band saw.

The parts so far described are standard or of ordinary construction and various other parts of the mill are shown but not specifically noted, because they form no part of the present invention.

The axle of the upper wheel 5, as is usual, is journaled in bearings 7 that are secured by set screws 8, to the pronged upper portions of the vertically movable wheel supporting columns 3.

It has hitherto been common to vertically move and support the wheel supporting columns 3 on the upper ends of vertically movable rods or plungers 9; and my invention is particularly directed to the provision of improved means for supporting and vertically moving these rods or plungers 9. The lower ends of the said plungers 9 are preferably made tubular and threaded bolts 10 are telescoped thereinto without screw threaded engagement therewith. Adjusting nuts 11 working on the bolts 10 directly engage the lower ends of the plungers 9, and are adapted to be moved in various different ways as, for instance, by pins 12 engaged with perforations therein. At their lower ends, the bolts 10 are provided with bifurcated heads, through the prongs of which bearing pins 13 are passed and are rigidly secured thereto. The bearing pins 13 rest in segmental seats 14 of heavy arms 15 which, as shown and preferred, are cast integral with heavy sleeves 16. The sleeves 16 are axially alined and, at their abutting ends, are formed with projecting flanges that are rigidly connected by short nutted bolts 17. Adjacent to the sleeves 16, the arms 15 are formed with segmental fulcrum seats 18 that rest on rounded or segmental fulcrums 19 of a bearing 20, which latter is fixed and is rigidly secured on the pedestals 2. To make the oscillating supporting frame composed of the sleeves 16 and arms 15 reversible, the said arms 15 are shown as provided, both at their upper and lower edges, with the seats 14 and 18.

At their abutting ends, the sleeves 16 are formed with an internal angular seat that receives the square or angular head 21 of a heavy rock shaft 22. One end of the rock shaft 22 projects and is provided with an arm 23 which, at its free end, is formed or provided with a segmental spur gear 24. The segmental gear 24 meshes with a spur pinion 25 secured on a shaft 26 mounted in suitable bearings 27 on the base frame 1. Also rigidly secured to and carried by the counter-shaft 26 is a ratchet wheel 28, an operating hand wheel 29 and a sheave 30. The usual counter-weighting cable, not shown, will be attached to the sheave 30, to approximately counter-poise the upper saw wheel and movable supports therefor.

Loosely pivoted on the shaft 26 and straddling the ratchet wheel 28 is a lever head 31 to which a lever 32 is secured. The lever 32 is provided with an adjustable weight 33, and the head 31 is provided with a pawl 34 that engages the teeth of the ratchet wheel 28.

The weight 33 is shown as provided with an eye 35 to which the hook of a small hand hoist may be attached when it is desired to throw the weighted lever 32 out of action and to disengage the ratchet wheel 28 from the pawl 34. When this is done, by manipulation of the hand wheel 29, the upper saw wheel may be easily raised and lowered.

After the saw has been applied to the wheels, the same may be put under the proper tension, first by turning the hand wheel 29 until the saw has been drawn taut, and then the weighted lever 32 having been raised to the proper altitude, the pawl 34 is engaged with the ratchet wheel 28. The weight of the said lever is then rendered operative through the said ratchet wheel, the oscillating frame 16—15 and the other coöperating parts, to put the proper tension on the saw. The amount of tension put upon the saw may be varied by adjustments of the weight 33 on the lever 32.

The upper wheel may be properly adjusted to the saw, by independent adjustments of the plungers 9, accomplished by adjustments of the nuts 11 on the pawls 10.

The important feature of improvement in this saw tension mechanism is found in the above described construction whereby torsional spring in the rock shaft 22 is rendered ineffective on the wheel supporting plungers 9. Hitherto, the spring in this shaft would affect one of the plungers 9 more than the other and, hence, would not maintain the proper engagement of the upper saw wheel with the saw. In the present instance, both of the plungers 9 are supported from an oscillating frame that is rigid and will not spring under the load which it carries and, hence, any torsional spring in the rock shaft 22 will not affect one of the plungers 9 more than the other and the proper set of the upper saw wheel will be maintained. This feature of improvement is highly important in the practical operation of the band saw.

What I claim is:

1. In a band saw mill, means for supporting the upper and lower band wheels, comprising a pair of plungers, a fulcrumed sleeve having arms supporting said plungers, and a rock shaft extended into said sleeve and connected thereto for oscillatory movements therewith, substantially as described.

2. In a band saw mill, means supporting the upper band saw wheel, comprising a pair of plungers, a fulcrumed sleeve having parallel arms supporting said plungers, a rock shaft extended into said sleeve and interlocked to the central portion thereof for oscillatory movements therewith, and a weight operating on said rock shaft, substantially as described.

3. In a band saw mill, means for supporting the upper band saw wheel, comprising a pair of plungers, a two-part sleeve, the sections of which are rigidly but detachably secured at their abutting ends, said sleeve sections being mounted on suitable fulcrums and having projecting parallel arms engaging and supporting the lower ends of said plungers, a rock shaft having an angular head seated in the abutting ends of the said sleeve sections, an arm secured to the outer end of said rock shaft and provided with a gear, a countershaft provided with a pinion meshing with said gear, and weighted devices operative on said countershaft, substantially as described.

4. In a band saw mill, means supporting the upper band saw wheel, comprising a pair of plungers, a fulcrumed sleeve having parallel arms supporting said plungers, a rock shaft extended into said sleeve and interlocked to the central portion thereof for oscillatory movement therewith, and a weight operating on said rock shaft, the upper and lower edges of said arms having seats for the lower ends of said plungers whereby the said sleeve is made reversible.

In testimony whereof I affix my signature in presence of two witnesses.

ADAM HENRY IRVING.

Witnesses:
BLANCHE RICHHART,
W. A. HOELAND.

---

Copies of this patent may be obtained for five cents each, by addressing the "Commissioner of Patents, Washington, D. C."